L. McMURRAY.
Improvement in Soldering-Tools.
No. 4,934. Reissued June 4, 1872.
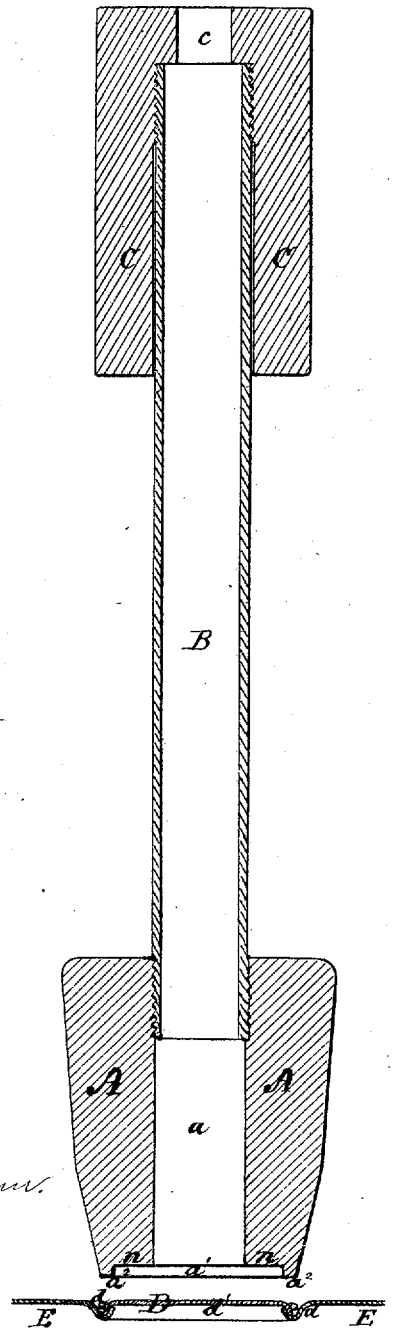
Witnesses
C. B. Nottingham.
J. R. Nottingham.
Inventor.
Louis McMurray
by atty N. Collok
AM. PHOTO-LITHOGRAPHIC CO. N.Y. (OSBORNE'S PROCESS.)

UNITED STATES PATENT OFFICE.

LOUIS McMURRAY, OF BALTIMORE, MARYLAND.

IMPROVEMENT IN SOLDERING-TOOLS.

Specification forming part of Letters Patent No. 123,276, dated January 30, 1872; reissue No. 4,934, dated June 4, 1872.

*To whom it may concern:*

Be it known that I, LOUIS McMURRAY, of Baltimore, Maryland, have invented a new and useful Improvement in Soldering-Tools, of which the following is a specification:

My improvement can best be understood by referring to what has already been done in the same direction. On the 6th day of June, 1871, Letters Patent of the United States numbered 115,760, were granted to myself and Robert Hollingsworth for an improvement in soldering-tools, to be used in soldering the tin caps on the tops of fruit and other cans of the same description, and where a flange on the under side of the soldering-block meets the wire of solder that rests in the groove prepared for it so as to unite the top and the cap, the cap being pressed upon the top and kept in place during the operation by an iron rod passing through a hole in the soldering-block and the wooden handle attached to it. There are objections to this contrivance which I now propose to overcome. The main feature in my improvement consists in dispensing altogether with the iron rod to keep down the cap, and so adjusting the depth of the depression within the flange that the bottom of the soldering-block shall keep the cap in place as long as required to complete the soldering.

The accompanying drawing represents a vertical central section of a soldering-tool made in accordance with my invention.

A is the soldering-block, provided with a suitable stem, B, and handle, C. The soldering-flange of the block is shown at $a^2$, and in the bottom of the block within this flange a concave or recess, $a^1$, is formed, which is of such depth that when the flange $a^2$ rests on the melted solder-wire at *d*, the recessed bottom *n n* of the block will rest on or be in contact with the cap D of the can. In order to receive any steam or gases that may arise during the operation of soldering, a chamber, *a*, is formed in the block, and this steam or gas may be carried off through an opening in the tool. This opening is shown as formed of the hollow stem B, and an aperture, *c*, in the handle C, communicating with the chamber *a*.

The operation of the tool is easily understood. The cap is put on the top E E of the can, the wire of solder *d* is laid in its place in the groove prepared for it, and the tool, properly heated, applied to the cap and turned by the workman horizontally to aid in the operation. The contact of the face or bottom *n n* of the block with the cap while the flange is melting the solder prevents the ascent of the latter on the cap which would otherwise take place; and any steam from the article in the can escaping through hole $a^1$ in the cap, or gas or fumes from the melted resin, are received in chamber *a*, and discharged through the hollow handle.

Under this arrangement I am enabled to entirely dispense with any auxiliary presser playing up and down within the soldering-block; and the latter serves not only to melt the solder, but also to hold the cap without disturbing it, and to cover its top during the soldering operation. The tool can also be manipulated and used much more expeditiously and easily than has been hitherto practicable, and the soldering operation can be performed with it more rapidly and in a better manner by less expert hands, and therefore more economically.

What I claim, and desire to secure by Letters Patent, is—

1. A tool for soldering caps on cans, the soldering-block of which is formed with a soldering-flange and a cap holding or pressing face, arranged so that the face will hold the cap in position while the flange melts the solder around the same during the operation of soldering, substantially as herein shown and described.

2. A block for soldering caps on cans, formed with a soldering-flange, a cap-holding or pressing face, and a chamber to receive any steam or gas arising during the soldering operation, substantially as shown and described.

3. In a tool for soldering caps on cans, the combination of a soldering-block formed with a soldering-flange, a cap-holding or pressing face, and a steam or gas-receiving chamber, as described, with an opening for the discharge from the tool or block of the steam or gas that may accumulate in said chamber during the soldering operation, substantially as herein shown and set forth.

4. A tool for soldering caps on cans, composed of a soldering-block formed with a soldering-flange, a cap-holding or pressing face, and a steam or gas-receiving chamber, as described, in combination with an upright stem and handle, substantially as shown and set forth.

In witness whereof I have hereunto signed my name in the presence of two subscribing witnesses.

LOUIS McMURRAY.

Witnesses:
A. C. FAIRFAX,
D. A. SATTA.